United States Patent
Hong et al.

(10) Patent No.: US 12,275,220 B2
(45) Date of Patent: Apr. 15, 2025

(54) METHOD FOR COMPRESSING LAMINATE AND METHOD FOR MANUFACTURING CERAMIC ELECTRONIC COMPONENT INCLUDING LAMINATE

(71) Applicant: SAMSUNG ELECTRO-MECHANICS CO., LTD., Suwon-si (KR)

(72) Inventors: Yong Min Hong, Suwon-si (KR); Jong Ho Lee, Suwon-si (KR); Yeong Ju Choe, Suwon-si (KR); Chun Soo Kim, Suwon-si (KR); Ji Hun Jeong, Suwon-si (KR); Je Sik Yeon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/847,549

(22) Filed: Jun. 23, 2022

(65) Prior Publication Data

US 2023/0114992 A1 Apr. 13, 2023

(30) Foreign Application Priority Data

Oct. 12, 2021 (KR) .................. 10-2021-0134818

(51) Int. Cl.
*B32B 37/10* (2006.01)
*B32B 18/00* (2006.01)
(Continued)

(52) U.S. Cl.
CPC .............. *B32B 37/10* (2013.01); *B32B 18/00* (2013.01); *B32B 37/06* (2013.01); *B32B 37/08* (2013.01);
(Continued)

(58) Field of Classification Search
None
See application file for complete search history.

(56) References Cited

U.S. PATENT DOCUMENTS

| | | | |
|---|---|---|---|
| 2003/0175520 A1* | 9/2003 | Grutta | ............... B29C 70/46 264/237 |
| 2012/0067509 A1* | 3/2012 | Kurtz | ............... B29C 70/46 156/181 |

(Continued)

FOREIGN PATENT DOCUMENTS

| JP | 2003-100550 A | 4/2003 |
|---|---|---|
| JP | 2006-148178 A | 6/2006 |

(Continued)

OTHER PUBLICATIONS

Korean Office Action dated Feb. 26, 2025 issued in Korean Patent Application No. 10-2021-0134818 (with English translation).

*Primary Examiner* — Michael N Orlando
*Assistant Examiner* — Abhishek A Patwardhan
(74) *Attorney, Agent, or Firm* — Morgan, Lewis & Bockius LLP

(57) ABSTRACT

Disclosed herein are relates to a method for compressing a laminate and a method for manufacturing a ceramic electronic component including a laminate. The method for compressing a laminate includes: preparing a laminate; pressurizing the laminate from a first pressure to a second pressure; heating the laminate from a first temperature to a second temperature; maintaining compression of the laminate at the second pressure and the second temperature for a predetermined time; cooling the laminate from the second temperature to a third temperature; and depressurizing the laminate from the second pressure to a third pressure, wherein the second temperature is 70° C. to 150° C.

17 Claims, 2 Drawing Sheets

(51) Int. Cl.
*B32B 37/06* (2006.01)
*B32B 37/08* (2006.01)
*B32B 37/18* (2006.01)
*B32B 38/00* (2006.01)
*C04B 37/00* (2006.01)
*C04B 41/00* (2006.01)
*C04B 41/51* (2006.01)
*C04B 41/88* (2006.01)

(52) U.S. Cl.
CPC .......... *B32B 37/18* (2013.01); *B32B 38/0004* (2013.01); *B32B 38/0036* (2013.01); *C04B 37/001* (2013.01); *C04B 41/009* (2013.01); *C04B 41/5144* (2013.01); *C04B 41/88* (2013.01); *B32B 2250/05* (2013.01); *B32B 2305/80* (2013.01); *B32B 2307/204* (2013.01); *B32B 2307/736* (2013.01); *B32B 2309/025* (2013.01); *B32B 2309/04* (2013.01); *B32B 2309/125* (2013.01); *B32B 2315/02* (2013.01); *B32B 2457/08* (2013.01); *B32B 2457/16* (2013.01); *C04B 2237/346* (2013.01)

(56) References Cited

U.S. PATENT DOCUMENTS

| 2013/0052412 | A1* | 2/2013 | Fox | B29C 45/0005 |
| | | | | 425/112 |
| 2013/0078417 | A1* | 3/2013 | Schmidt | C08J 5/244 |
| | | | | 428/116 |
| 2013/0241100 | A1* | 9/2013 | Lownsdale | B29C 35/04 |
| | | | | 165/61 |
| 2014/0159267 | A1 | 6/2014 | Murch et al. | |
| 2015/0137427 | A1* | 5/2015 | Matsen | B23K 20/12 |
| | | | | 425/174 |
| 2017/0320785 | A1* | 11/2017 | Matsumoto | C04B 35/71 |
| 2022/0059289 | A1* | 2/2022 | Tanaka | B32B 37/10 |

FOREIGN PATENT DOCUMENTS

| JP | 2008-135639 A | 6/2008 |
| KR | 10-2014-0053143 A | 5/2014 |

\* cited by examiner

METHOD FOR COMPRESSING LAMINATE AND METHOD FOR MANUFACTURING CERAMIC ELECTRONIC COMPONENT INCLUDING LAMINATE

CROSS-REFERENCE TO RELATED APPLICATION(S)

This application claims the benefit of priority to Korean Patent Application No. 10-2021-0134818 filed on Oct. 12, 2021 in the Korean Intellectual Property Office, the disclosure of which is incorporated herein by reference in its entirety.

TECHNICAL FIELD

The present disclosure relates to a method for compressing a laminate and a method for manufacturing a ceramic electronic component including a laminate.

BACKGROUND

When a ceramic electronic component such as a multilayer capacitor, a multilayer inductor, a multilayer alumina substrate, and a multilayer varistor is manufactured, a laminate is formed by stacking ceramic green sheets including conductor patterns, and a process of compressing such a laminate is then performed.

Meanwhile, the process of compressing the laminate is performed at a high temperature and a high pressure, and thus, a deformation defect of the laminate may occur due to a non-linear shrinkage phenomenon of the laminate. In this case, a cutting defect of the laminate may occur due to insufficiency of a margin portion.

SUMMARY

An aspect of the present disclosure may provide a method for compressing a laminate capable of suppressing a deformation defect due to a non-linear shrinkage phenomenon, and a method for manufacturing a ceramic electronic component including a laminate.

According to an aspect of the present disclosure, a compression process may be performed by first performing a pressurization process at low temperature, performing a temperature increasing process and a maintaining process, and then performing a cooling process and a depressurization process. In this case, a final temperature of a laminate after temperature increasing may be about 70° C. to 150° C.

According to an aspect of the present disclosure, a method for compressing a laminate may include: preparing a laminate; pressurizing the laminate from a first pressure to a second pressure; heating the laminate from a first temperature to a second temperature; maintaining compression of the laminate at the second pressure and the second temperature for a predetermined time; cooling the laminate from the second temperature to a third temperature; and depressurizing the laminate from the second pressure to a third pressure, wherein the second temperature is 70° C. to 150° C.

According to another aspect of the present disclosure, a method for manufacturing a ceramic electronic component may include: forming a ceramic laminate by stacking dielectric sheets on which conductor patterns are printed; compressing the ceramic laminate; and cutting the compressed ceramic laminate, and wherein the compressing of the ceramic laminate includes: pressurizing the ceramic laminate from a first pressure to a second pressure; heating the ceramic laminate from a first temperature to a second temperature; maintaining compression of the ceramic laminate for a predetermined time at the second pressure and the second temperature; cooling the ceramic laminate from the second temperature to a third temperature; and depressurizing the ceramic laminate from the second pressure to a third pressure, the second temperature being 70° C. to 150° C.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
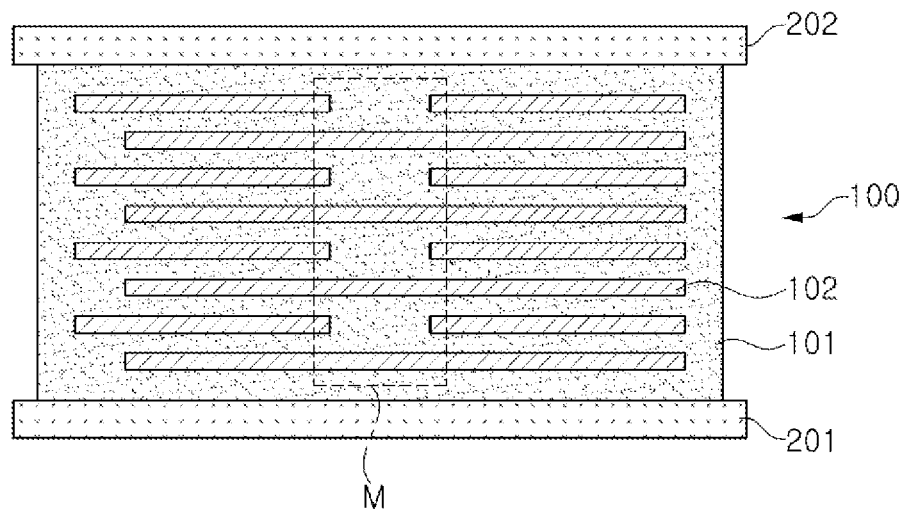
FIG. 1 is a schematic cross-sectional view illustrating a compression process of a laminate.

Hereinafter, exemplary embodiments in the present disclosure will be described with reference to the accompanying drawings. In the accompanying drawings, shapes, sizes, and the like, of components may be exaggerated or shortened for clarity.

Herein, expressions such as a side portion and a side surface are used to refer to a left/right direction or a surface in the left/right direction in the drawings for convenience, expressions such as an upper side, an upper portion, and an upper surface are used to refer to an upward direction or a surface in the upward direction in the drawings for convenience, and expressions such as a lower side, a lower portion, and a lower surface are used to refer to a downward direction or a surface in the downward direction in the drawings for convenience. In addition, "positioned on the side portion, on the upper side, above, on the lower side, or below" conceptually includes a case in which a target component is positioned in a corresponding direction, but does not be in direct contact with a reference component, as well as a case in which the target component is in direct contact with the reference component in the corresponding direction. However, these directions are defined for convenience of explanation, and the claims are not particularly limited by the directions defined as described above, and concepts of upper and lower portions may be exchanged with each other at any time.

The meaning of a "connection" of a component to another component in the description conceptually includes an indirect connection through an adhesive layer as well as a direct connection between two components. In addition, "electrically connected" conceptually includes a physical connection and a physical disconnection. It may be understood that when an element is referred to with terms such as "first" and "second", the element is not limited thereby. They may be used only for a purpose of distinguishing the element from the other elements, and may not limit the sequence or importance of the elements. In some cases, a first element may be referred to as a second element without departing from the scope of the claims set forth herein. Similarly, a second element may also be referred to as a first element.

The term "an exemplary embodiment" used herein does not refer to the same exemplary embodiment, and is provided to emphasize a particular feature or characteristic different from that of another exemplary embodiment. However, exemplary embodiments provided herein are considered to be able to be implemented by being combined in whole or in part one with one another. For example, one element described in a particular exemplary embodiment, even if it is not described in another exemplary embodiment, may be understood as a description related to another exemplary embodiment, unless an opposite or contradictory description is provided therein.

Terms used herein are used only in order to describe an exemplary embodiment rather than limiting the present disclosure. In this case, singular forms include plural forms unless interpreted otherwise in context.

FIG. 1 is a schematic cross-sectional view illustrating a compression process of a laminate.

Figure 2:
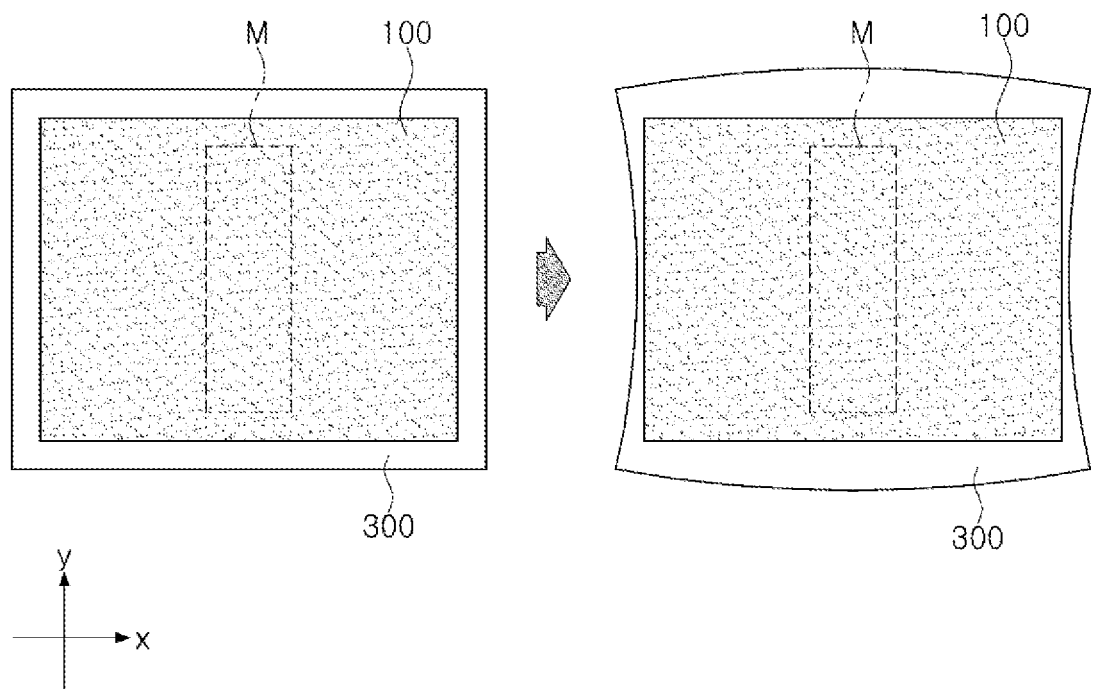
FIG. 2 is a schematic view illustrating a non-linear shrinkage phenomenon due to the compression process.

FIG. 2 is a schematic view illustrating a non-linear shrinkage phenomenon due to the compression process.

Referring to FIGS. 1 and 2, a laminate to be subjected to a compression process may be, for example, a ceramic laminate 100. The ceramic laminate 100 may be a precursor of a ceramic electronic component such as, for example, a multilayer capacitor, a multilayer inductor, a multilayer alumina substrate, and a multilayer varistor. In some embodiments, the ceramic laminate 100 may be a precursor of a multilayer capacitor. In this case, the ceramic laminate 100 may include dielectric layers 101 and internal electrodes 102.

The ceramic laminate 100 may be formed by repeating a process of manufacturing a dielectric sheet and a process of printing a conductor pattern on the dielectric sheet to form a plurality of dielectric sheets on which the conductor patterns are printed, and then stacking the plurality of dielectric sheets. The dielectric sheet may be formed by mixing ceramic powder particles, a binder, a solvent, and the like, with each other, preparing a slurry, and then coating the slurry uniformly and thinly on a film. The conductor pattern may be formed on a dielectric sheet by a method such as screen-printing. For example, the conductor pattern may be formed by applying and drying a conductive paste including at least one of silver (Ag), lead (Pb), platinum (Pt), nickel (Ni), and copper (Cu). The ceramic laminate 100 may be formed by stacking the dielectric sheets on which such conductor patterns are printed, by a desired capacity. If necessary, dielectric sheets on which the conductor patterns are not printed may be further stacked in required positions. That is, the ceramic laminate 100 may further include the dielectric sheets on which the conductor patterns are not printed. As an example, the stacked dielectric sheet may constitute the dielectric layer 101, and the conductor pattern may constitute the internal electrode 102.

The compression process may be performed by applying a pressure to the ceramic laminate 100 using a lower compression member 201 and an upper compression member 202. In addition, the compression process may be performed through temperature increasing and cooling processes as well as such a pressurization process. After the compression process, a non-linear shrinkage phenomenon of the ceramic laminate 100 may occur. In this case, an index region 300, which is an edge portion of the ceramic laminate 100, may lose straightness due to deformation. In this case, a central margin (M) region may be affected. When it is difficult to sufficiently secure the margin (M) region, a cutting defect may occur at the time of performing a cutting process. For example, when the ceramic laminate is cut, a place other than the center of the margin (M) region may be cut. In this case, a short section in left/right margins of each chip after being cut may be generated, which may correspond to a specification defect.

After the compression process, the compressed ceramic laminate 100 may be cut into a required chip size. Thereafter, each of the compressed and cut ceramic laminates 100 may be sintered at a high temperature, for example, about 1200° C. to 1300° C. to form a ceramic body having a chip size. If necessary, such a ceramic body may be put into a barrel and rotated to perform a polishing process of making an angular shape of the ceramic body round. Thereafter, external electrodes may be formed on the ceramic body. For example, the external electrode may be formed by applying a conductive paste including a conductive material such as copper (Cu) onto the ceramic body, firing the conductive paste by heat treatment, and then additionally electroplating nickel (Ni), tin (Sn), and the like, step by step.

A ceramic electronic component, for example, a multilayer capacitor may be manufactured through a series of processes, but this is only an example, and a method for manufacturing the ceramic electronic component is not limited thereto.

Figure 3:
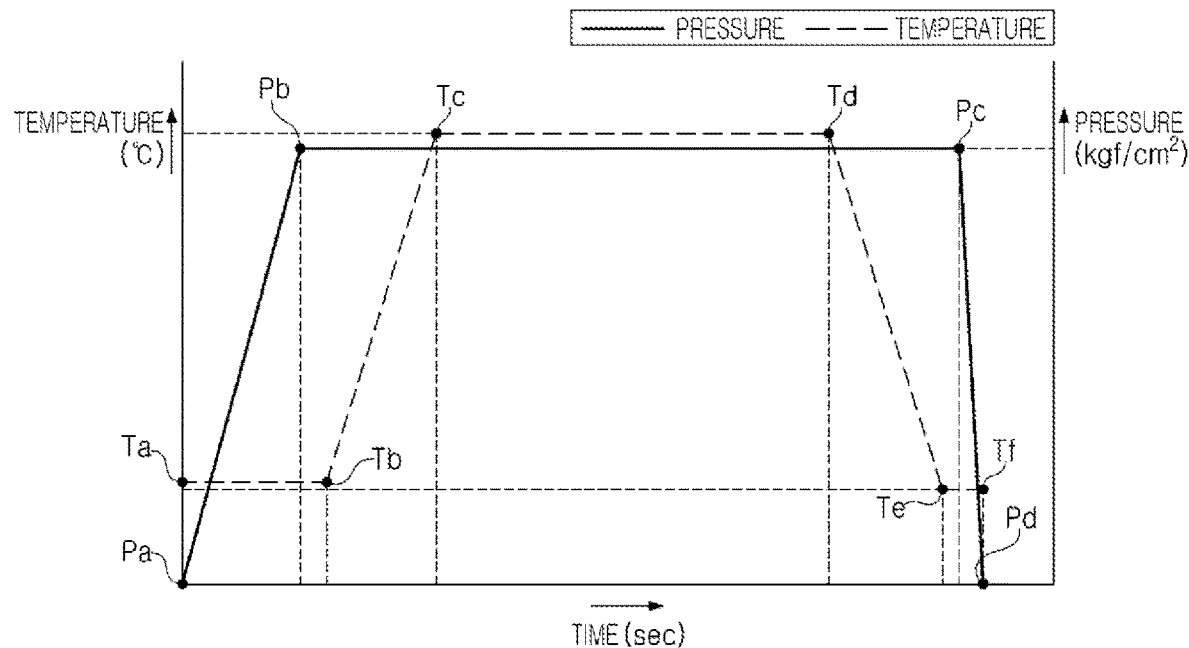
FIG. 3 is schematic graphs illustrating an example of pressure and temperature profiles of the compression process.

FIG. 3 is schematic graphs illustrating pressure and temperature profiles of the compression process.

Referring to FIG. 3, in a compression process according to an exemplary embodiment, pressurization may be first performed on a laminate at a low temperature, heating may be performed on the laminate after the pressurization, the compression of the laminate may be maintained for a predetermined time after a temperature of the laminate reaches a final temperature, cooling may be performed on the laminate, and depressurization may then be performed on the laminate when the temperature of the laminate becomes low again. If necessary, the cooling may also be performed after the depressurization.

For example, the compression process according to an exemplary embodiment may include pressurizing the laminate from a first pressure section Pa to a second pressure section Pb to Pc in a first temperature section Ta to Tb, which is a relatively low temperature, heating the laminate from the first temperature section Ta to Tb to a second temperature section Tc to Td in a state of maintaining the second pressure section Pb to Pc, maintaining the compression of the laminate for a predetermined time in the second pressure section (Pb to Pc) and the second temperature section Tc to Td, cooling the laminate from the second temperature section Tc to Td to a third temperature section Te to Tf in the second pressure section Pb to Pc, and depressurizing the laminate from the second pressure section Pb to Pc to a third pressure section Pd in the third temperature section Te to Tf, which is a relatively low temperature. Through such processes, a deformation defect of the laminate due to non-linear shrinkage may be effectively suppressed.

A temperature of the second temperature section Tc to Td may be a temperature equal to or higher than a glass transition temperature of the laminate, for example, about 70° C. to 150° C. or about 85° C. to 130° C. when the laminate is the above-described ceramic laminate, or the like. When the temperature of the second temperature section Tc to Td, which is a temperature at which the compression is maintained, is within such a range, a deformation defect of the laminate due to non-linear shrinkage may be more effectively suppressed without other side effects. From such a point of view, a temperature of the first temperature section Ta to Tb may be approximately 25° C. to 55° C. In addition, a temperature of the third temperature section Te to Tf may be approximately 25° C. to 55° C.

A pressure of the second pressure section Pb to Pc may be about 500 kgf/cm² to 1500 kgf/cm² or about 500 kgf/cm² to 1000 kgf/cm². When the pressure of the second pressure section Pb to Pc, which is a pressure at which the compression is maintained, is within such a range, the deformation defect of the laminate due to the non-linear shrinkage may be more effectively suppressed without other side effects such as delamination. Meanwhile, a pressure of the first pressure section Pa may be about 0 kgf/cm² to 10 kgf/cm² and a pressure of the third pressure section Pd may be about 0 kgf/cm² to 10 kgf/cm². However, pressures of the first pressure section Pa and the third pressure section Pd are not limited thereto as long as they are within a range smaller than the second pressure section Pb to Pc.

In the first temperature section Ta to Tb, temperatures of two points Ta and Tb may be the same as each other or substantially similar to each other within the above-described temperature range. In addition, in the second temperature section Tc to Td, temperatures of two points Tc and Td may be the same as each other or substantially similar to each other within the above-described temperature range. In addition, in the third temperature section Te to Tf, temperatures of two points Te and Tf may be the same as each other or substantially similar to each other within the above-described temperature range. In addition, in the second pressure section Pb to Pc, pressures of two points Pb and Pc may be the same as each other or substantially similar to each other within the above-described pressure range.

Meanwhile, in the maintaining of the compression of the laminate, a maintaining time is not particularly limited, and may be about 10 sec to 1800 sec. When the maintaining time is within the above-mentioned range, the deformation defect of the laminate due to the non-linear shrinkage may be more effectively suppressed without other side effects.

In addition, in the heating of the laminate, a temperature increasing rate is not particularly limited, and may be about 1° C./min to 20° C./min. In addition, in the cooling of the laminate, a cooling rate is not particularly limited, and may be about 1° C./min to 20° C./min. When the temperature increasing rate and the cooling rate are within the above-mentioned ranges, the deformation defect of the laminate due to the non-linear shrinkage may be more effectively suppressed without other side effects.

Meanwhile, a depressurization rate may be faster than a pressurization rate, through which the deformation defect of the laminate due to the non-linear shrinkage may be more effectively suppressed.

Figure 4:
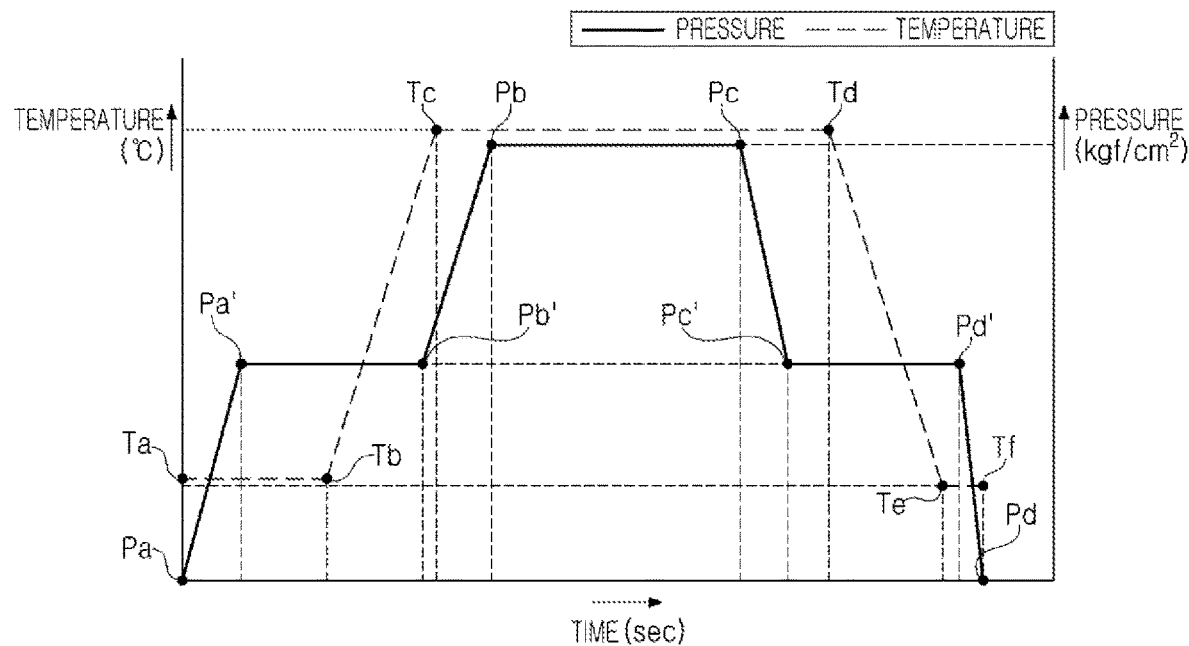
FIG. 4 is schematic graphs illustrating another example of pressure and temperature profiles of the compression process.

FIG. 4 is schematic graphs illustrating another example of pressure and temperature profiles of the compression process.

Referring to FIG. 4, in a compression process according to another exemplary embodiment, primary pressurization may be first performed on a laminate at a low temperature, heating may be performed on the laminate after the primary pressurization, secondary pressurization may be performed on the laminate after a temperature of the laminate reaches a final temperature, the compression of the laminate may be maintained for a predetermined time, primary depressurization may be performed on the laminate, cooling may be performed on the laminate, and second depressurization may then be performed on the laminate when the temperature of the laminate becomes low again. If necessary, the cooling may also be performed after the secondary depressurization.

For example, the compression process according to another exemplary embodiment may include primarily pressurizing the laminate from a first pressure section Pa to a 1-2-th pressure section Pa' to Pb') in a first temperature section Ta to Tb, which is a relatively low temperature, heating the laminate from a first temperature section Ta to Tb to a second temperature section Tc to Td in the 1-2-th pressure section Pa' to Pb', secondarily pressurizing the laminate from the 1-2-th pressure section Pa' to Pb' to a second pressure section Pb to Pc, maintaining the compression of the laminate for a predetermined time in the second pressure section Pb to Pc and the second temperature section Tc to Td, primarily depressurizing the laminate from the second pressure section Pb to Pc to a 2-3-th pressure section Pc' to Pd', cooling the laminate from the second temperature section Tc to Td to a third temperature section Te to Tf in the 2-3-th pressure section Pc' to Pd', and secondarily depressurizing the laminate from the 2-3-th pressure section Pc' to Pd' to a third pressure section Pd in the third temperature section Te to Tf, which is a relatively low temperature. Through such processes, a deformation defect of the laminate due to non-linear shrinkage may be effectively suppressed.

A temperature of the second temperature section Tc to Td may be a temperature equal to or higher than a glass transition temperature of the laminate, for example, about 70° C. to 150° C. or about 85° C. to 130° C. when the laminate is the above-described ceramic laminate, or the like. When the temperature of the second temperature section Tc to Td, which is a temperature at which the compression is maintained, is within such a range, a deformation defect of the laminate due to non-linear shrinkage may be more effectively suppressed without other side effects. From such a point of view, a temperature of the first temperature section Ta to Tb may be approximately 25° C. to 55° C. In addition, a temperature of the third temperature section Te to Tf may be approximately 25° C. to 55° C.

A pressure of the second pressure section Pb to Pc may be about 500 kgf/cm² to 1500 kgf/cm² or about 500 kgf/cm² to 1000 kgf/cm². When the pressure of the second pressure section Pb to Pc, which is a pressure at which the compression is maintained, is within such a range, the deformation defect of the laminate due to the non-linear shrinkage may be more effectively suppressed without other side effects such as delamination. From such a point of view, a pressure of the 1-2-th pressure section Pa' to Pb' may be about 30 kgf/cm² to 500 kgf/cm², and a pressure of the 2-3-th pressure section Pc' to Pd' may be about 30 kgf/cm² to 500 kgf/cm². Meanwhile, a pressure of the first pressure section Pa may be about 0 kgf/cm² to 10 kgf/cm² and a pressure of the third pressure section Pd may be about 0 kgf/cm² to 10 kgf/cm². However, pressures of the first pressure section Pa and the third pressure section Pd are not limited thereto as long as they are within a range smaller than the second pressure section Pb to Pc.

In the first temperature section Ta to Tb, temperatures of two points Ta and Tb may be the same as each other or substantially similar to each other within the above-described temperature range. In addition, in the second temperature section Tc to Td, temperatures of two points Tc and Td may be the same as each other or substantially similar to each other within the above-described temperature range. In addition, in the third temperature section Te to Tf, temperatures of two points Te and Tf may be the same as each other or substantially similar to each other within the above-described temperature range. In addition, in the second pressure section Pb to Pc, pressures of two points Pb and Pc may be the same as each other or substantially similar to each other within the above-described pressure range. In addition, in the 1-2-th pressure section Pb' to Pc', pressures of two points Pb' and Pc' may be the same as each other or substantially similar to each other within the above-described pressure range. In addition, in the 2-3-th pressure section Pc' to Pd', pressures of two points Pc' and Pd' may be the same as each other or substantially similar to each other within the above-described pressure range.

Meanwhile, in the maintaining of the compression of the laminate, a maintaining time is not particularly limited, and may be about 10 sec to 1800 sec. When the maintaining time is within the above-mentioned range, the deformation defect of the laminate due to the non-linear shrinkage may be more effectively suppressed without other side effects.

In addition, in the heating of the laminate, a temperature increasing rate is not particularly limited, and may be about 1° C./min to 20° C./min. In addition, in the cooling of the laminate, a cooling rate is not particularly limited, and may be about 1° C./min to 20° C./min. When the temperature increasing rate and the cooling rate are within the above-mentioned ranges, the deformation defect of the laminate due to the non-linear shrinkage may be more effectively suppressed without other side effects.

under conditions of [Table 1] to [Table 8], and results of shrinkage rates and cutting defects of laminates after the compression processes were shown.

Meanwhile, the shrinkage rate refers to a change rate of the ceramic laminate in length (x) and width (y) directions as illustrated in FIG. 2. In this case, the shrinkage rate (design) refers to a shrinkage rate of the ceramic laminate after being compressed with respect to a design value when a conductor pattern is printed on the dielectric sheet. In addition, the shrinkage rate (compression) refers to a shrinkage rate of the ceramic laminate before/after being compressed. These shrinkage rates were calculated by inserting a printed mark into the lower compression member when the ceramic laminate is stacked, measuring coordinates of the printed mark using a two-dimensional measuring instrument, measuring coordinates of the printed mark again after the ceramic laminate is compressed, and then using lengths of respective points.

In addition, the cutting defect refers to a deformable cutting defect that has occurred in a cutting inspection, which is a process inspection after the laminate is cut, and specifically refers to a state in which the center of a margin is not cut in an individual chip after being cut, such that the margin is retained by a reference length or less. The cutting defect was evaluated by a visual inspection using a magnifier with a magnifying power of about 10 to 22.

TABLE 1

| | | (Shrinkage Rate (Design)) | | (Shrinkage Rate (Compression)) | | Cutting | |
|---|---|---|---|---|---|---|---|
| | Division | X Shrinkage | Y Shrinkage | X Shrinkage | Y Shrinkage | Defect Deformable | Remark |
| 1 | Ref | 0.65% | 0.91% | 0.30% | 0.62% | 5% | Compression: 500 kgf/cm² Heat Treatment: 85° C. Final Temperature: 85° C. Final Pressure: 500 kgf/cm² Temperature increasing Rate: 10° C./min Cooling Rate: 10° C./min Maintaining Time: 1800 sec Start Temperature: 25° C. Completion Temperature: 25° C. |
| 2 | Temperature increasing/ Cooling | 0.28% | 0.28% | −0.07% | −0.01% | 1% | |
| 3 | Temperature increasing | 0.49% | 0.49% | 0.15% | 0.19% | 0% | |
| 4 | Cooling | 0.28% | 0.35% | 0.00% | 0.12% | 2% | |

Experimental Example

Hereinafter, an effect of the present disclosure will be described through an experiment. The ceramic laminate described with reference to FIG. 1 was used for the experiment. The ceramic laminate was prepared by repeating a process of manufacturing a dielectric sheet using a barium titanate-based dielectric material and a process of printing a conductive paste including nickel (Ni) on the dielectric sheet to form 550 dielectric sheets on which the conductive pastes are printed, and then stacking the 550 dielectric sheets. Thereafter, various compression processes were performed It can be seen from Table 1 that Experimental Example 2 to 4 in which a laminate is subjected to a temperature increasing process and/or a cooling process in a pressure-maintaining state after pressurization are effective in suppressing a deformation defect due to a non-linear shrinkage phenomenon as compared with Experimental Example 1 in which a laminate is simply subjected to pressurization/ maintenance/depressurization under a high-temperature condition. In addition, it can be seen from Table 1 that Experimental Example 2 and 3 in which a laminate is subjected to at least a temperature increasing process in a pressure-maintaining state after pressurization are effective in suppressing a deformation defect due to a non-linear shrinkage phenomenon as compared with Experimental Example 4 in which a laminate is subjected to only a cooling process in a pressure-maintaining state after pressurization.

TABLE 2

| Division | | (Shrinkage Rate (Design)) | | (Shrinkage Rate (Compression)) | | Cutting | |
|---|---|---|---|---|---|---|---|
| | | X Shrinkage | Y Shrinkage | X Shrinkage | Y Shrinkage | Defect Deformable | Remark |
| 5 | 55° C. | 0.47% | 0.61% | 0.21% | 0.34% | 8% | Final Pressure: 500 kgf/cm$^2$ |
| 6 | 70° C. | 0.29% | 0.31% | −0.09% | −0.02% | 2% | Temperature increasing |
| 7 | 85° C. | 0.28% | 0.28% | −0.07% | −0.01% | 1% | Rate: 10° C./min |
| 8 | 130° C. | 0.30% | 0.35% | 0.03% | 0.02% | 1% | Cooling Rate: 10° C./min |
| 9 | 140° C. | 0.31% | 0.37% | 0.05% | 0.04% | 2% | Maintaining Time: 1800 sec |
| 10 | 150° C. | 0.31% | 0.34% | 0.1% | 0.06% | 2% | Start Temperature: 25° C. |
| 11 | 180° C. | 0.35% | 0.38% | 0.15% | 0.1% | 4% | Completion Temperature: 25° C. |

It can be seen from Table 2 that when a laminate is subjected to all of temperature increasing/maintenance/cooling in a pressure-maintaining state after pressurization, Experimental Examples 6 to 10 in which a final temperature of a laminate after temperature increasing is about 70° C. to 150° C. are effective in suppressing a deformation defect due to a non-linear shrinkage phenomenon as compared with Experimental Example 4 in which a final temperature of a laminate after temperature increasing is out of the above-described range. Meanwhile, in Experimental Example 11 in which a laminate is subjected to all of temperature increasing/maintenance/cooling in a pressure-maintaining state after pressurization, but a final temperature of a laminate after temperature increasing is 180° C., which exceeds 150° C., a problem that chips are reattached to each other after a cutting process occurred.

TABLE 3

| Division | | (Shrinkage Rate (Design)) | | (Shrinkage Rate (Compression)) | | Cutting | |
|---|---|---|---|---|---|---|---|
| | | X Shrinkage | Y Shrinkage | X Shrinkage | Y Shrinkage | Defect Deformable | Remark |
| 12 | Ref | 0.86% | 0.60% | 0.34% | 0.62% | 23.07% | Compression: 500 kgf/cm$^2$ Heat Treatment: 120° C. |
| 13 | 500 kgf/cm$^2$ | 0.32% | 0.29% | −0.01% | −0.02% | 2.6% | Final Temperature: 120° C. |
| 14 | 1000 kgf/cm$^2$ | 0.21% | 0.18% | −0.12% | −0.14% | 2.7% | Temperature increasing |
| 15 | 1500 kgf/cm$^2$ | 0.12% | 0.1% | −0.21% | −0.22% | 2.20 | Rate: 10° C./min Cooling Rate: 10° C./min Maintaining Time: 1800 sec Start Temperature: 25° C. Completion Temperature: 25° C. |

It can be seen from Table 3 that when a laminate is subjected to all of temperature increasing/maintenance/cooling in a pressure-maintaining state after pressurization, Experimental Examples 13 to 15 in which a final temperature of a laminate after pressurization is about 500 kgf/cm2 to 1500 kgf/cm2 are effective in suppressing a deformation defect due to a non-linear shrinkage phenomenon without side effects such as delamination as compared with Experimental Example 12 in which a laminate is simply subjected to pressurization/maintenance/depressurization under a high-temperature condition.

TABLE 4

| Division | | (Shrinkage Rate (Design)) | | (Shrinkage Rate (Compression)) | | Cutting | |
|---|---|---|---|---|---|---|---|
| | | X Shrinkage | Y Shrinkage | X Shrinkage | Y Shrinkage | Defect Deformable | Remark |
| 15 | Ref | 0.86% | 0.60% | 0.34% | 0.62% | 23.07% | Compression: 500 kgf/cm$^2$ Heat Treatment: 120° C. |
| 16 | 30 kgf/cm$^2$ | 0.31% | 0.39% | 0.07% | 0.03% | 5.65% | Final Temperature: 120° C. |
| 17 | 50 kgf/cm$^2$ | 0.30% | 0.35% | 0.04% | 0.02% | 6.35% | Final Pressure: 500 kgf/cm$^2$ |
| 18 | 100 kgf/cm$^2$ | 0.29% | 0.37% | 0.04% | 0.01% | 1.63% | Temperature increasing |
| 19 | 200 kgf/cm$^2$ | 0.28% | 0.36% | 0.04% | 0.00% | 4.57% | Rate: 10° C./min |

TABLE 4-continued

| Division | | (Shrinkage Rate (Design)) | | (Shrinkage Rate (Compression)) | | Cutting | Remark |
|---|---|---|---|---|---|---|---|
| | | X Shrinkage | Y Shrinkage | X Shrinkage | Y Shrinkage | Defect Deformable | |
| 20 | 400 kgf/cm² | 0.28% | 0.36% | 0.04% | 0.01% | 7.47% | Cooling Rate: 10° C./min<br>Maintaining Time: 1800 sec<br>Start Temperature: 25° C.<br>Completion Temperature: 25° C. |

It can be seen from Table 4 that when pressurization and depressurization are performed twice, for example, when a laminate is subjected to pressurization/temperature increasing/pressurization/maintenance/depressurization/cooling/depressurization, Experimental Examples 16 to 20 in which a pressure of a laminate at the time of temperature increasing and cooling is about 30 kgf/cm² to 500 kgf/cm² are effective in suppressing a deformation defect due to a non-linear shrinkage phenomenon as compared with Experimental Example 15 in which a laminate is simply subjected to pressurization/maintenance/depressurization under a high-temperature condition.

TABLE 5

| Division | | (Shrinkage Rate (Design)) | | (Shrinkage Rate (Compression)) | | Cutting | Remark |
|---|---|---|---|---|---|---|---|
| | | X Shrinkage | Y Shrinkage | X Shrinkage | Y Shrinkage | Defect Deformable | |
| 21 | Ref | 0.86% | 0.60% | 0.34% | 0.62% | 23.07% | Compression: 500 kgf/cm²<br>Heat Treatment: 120° C. |
| 22 | 1° C./min | 0.29% | 0.37% | 0.0% | 0.00% | 6.6% | Final Temperature: 120° C. |
| 23 | 5° C./min | 0.27% | 0.35% | 0.0% | 0.01% | 7.7% | Final Pressure: 500 kgf/cm² |
| 24 | 10° C./min | 0.28% | 0.36% | 0.0% | 0.01% | 7.5% | Cooling Rate: 10° C./min |
| 25 | 20° C./min | 0.30% | 0.33% | 0.0% | 0.03% | 4.9% | Maintaining Time: 1800 sec<br>Start Temperature: 25° C.<br>Completion Temperature: 25° C. |

It can be seen from Table 5 that when a laminate is subjected to all of temperature increasing/maintenance/cooling in a pressure-maintaining state after pressurization, Experimental Examples 22 to 25 in which a temperature increasing rate is about 1° C./min to 20° C./min are effective in suppressing a deformation defect due to a non-linear shrinkage phenomenon as compared with Experimental Example 21 in which a laminate is simply subjected to pressurization/maintenance/depressurization under a high-temperature condition.

TABLE 6

| Division | | (Shrinkage Rate (Design)) | | (Shrinkage Rate (Compression)) | | Cutting | Remark |
|---|---|---|---|---|---|---|---|
| | | X Shrinkage | Y Shrinkage | X Shrinkage | Y Shrinkage | Defect Deformable | |
| 26 | Ref | 0.86% | 0.60% | 0.34% | 0.62% | 23.07% | Compression: 500 kgf/cm²<br>Heat Treatment: 120° C. |
| 27 | 1° C./min | 0.45% | 0.40% | 0.00% | −0.01% | 15.9% | Final Temperature: 120° C. |
| 28 | 10° C./min | 0.28% | 0.36% | 0.0% | 0.01% | 7.5% | Final Pressure: 500 kgf/cm²<br>Temperature increasing Rate: 10° C./min<br>Maintaining Time: 1800 sec<br>Start Temperature: 25° C.<br>Completion Temperature: 25° C. |

It can be seen from Table 6 that when a laminate is subjected to all of temperature increasing/maintenance/cooling in a pressure-maintaining state after pressurization, Experimental Examples 27 and 28 in which a cooling rate is about 1° C./min to 20° C./min are effective in suppressing a deformation defect due to a non-linear shrinkage phenomenon as compared with Experimental Example 26 in which a laminate is simply subjected to pressurization/maintenance/depressurization under a high-temperature condition.

TABLE 7

| Division | | (Shrinkage Rate (Design)) | | (Shrinkage Rate (Compression)) | | Cutting Defect Deformable | Remark |
|---|---|---|---|---|---|---|---|
| | | X Shrinkage | Y Shrinkage | X Shrinkage | Y Shrinkage | | |
| 29 | Ref | 0.86% | 0.60% | 0.34% | 0.62% | 23.07% | Compression: 500 kgf/cm² |
| | | | | | | | Heat Treatment: 120° C. |
| 30 | 10 sec | 0.26% | 0.33% | 0.06% | 0.03% | 3.9% | Final Temperature: 120° C. |
| 31 | 60 sec | 0.27% | 0.34% | 0.05% | 0.01% | 2.6% | Final Pressure: 500 kgf/cm² |
| 32 | 300 sec | 0.28% | 0.32% | 0.04% | 0.00% | 6.7% | Temperature increasing |
| 33 | 1800 sec | 0.30% | 0.36% | 0.07% | 0.03% | 6.7% | Rate: 1° C./min |
| | | | | | | | Cooling Rate: 1° C./min |
| | | | | | | | Start Temperature: 25° C. |
| | | | | | | | Completion Temperature: 25° C. |

It can be seen from Table 7 that when a laminate is subjected to all of temperature increasing/maintenance/cooling in a pressure-maintaining state after pressurization, Experimental Examples 30 to 33 in which a maintaining time about 10 sec to 1800 sec are effective in suppressing a deformation defect due to a non-linear shrinkage phenomenon as compared with Experimental Example 29 in which a laminate is simply subjected to pressurization/maintenance/depressurization under a high-temperature condition.

TABLE 8

| Division | | (Shrinkage Rate (Design)) | | (Shrinkage Rate (Compression)) | | Cutting Defect Deformable | Remark |
|---|---|---|---|---|---|---|---|
| | | X Shrinkage | Y Shrinkage | X Shrinkage | Y Shrinkage | | |
| 34 | Ref | 0.86% | 0.60% | 0.34% | 0.62% | 23.07% | Compression: 500 kgf/cm² |
| | | | | | | | Heat Treatment: 120° C. |
| 35 | 25° C./25° C. | 0.30% | 0.36% | 0.07% | 0.03% | 6.7% | Final Temperature: 120° C. |
| 36 | 40° C./25° C. | 0.27% | 0.33% | 0.00% | 0.01% | 11.0% | Final Pressure: 500 kgf/cm² |
| | | | | | | | Temperature increasing |
| | | | | | | | Rate: 1° C./min |
| | | | | | | | Cooling Rate: 1° C./min |
| | | | | | | | Maintaining Time: 1800 sec |

It can be seen from Table 8 that when a laminate is subjected to all of temperature increasing/maintenance/cooling in a pressure-maintaining state after pressurization, Experimental Examples 35 and 36 in which start/completion temperatures are about 25° C. to 55° C. are effective in suppressing a deformation defect due to a non-linear shrinkage phenomenon as compared with Experimental Example 34 in which a laminate is simply subjected to pressurization/maintenance/depressurization under a high-temperature condition.

As set forth above, according to an exemplary embodiment in the present disclosure, a method for compressing a laminate capable of suppressing a deformation defect due to a non-linear shrinkage phenomenon, and a method for manufacturing a ceramic electronic component including a laminate may be provided.

While exemplary embodiments have been shown and described above, it will be apparent to those skilled in the art that modifications and variations could be made without departing from the scope of the present invention as defined by the appended claims.

What is claimed is:

1. A method for compressing a ceramic laminate, comprising:
    preparing the ceramic laminate, the ceramic laminate comprising a plurality of dielectric sheets and a conductor pattern disposed thereon;
    pressurizing the ceramic laminate from a first pressure to a second pressure;
    heating the ceramic laminate from a first temperature to a second temperature;
    maintaining compression of the ceramic laminate at the second pressure and the second temperature for a predetermined time;
    cooling the ceramic laminate from the second temperature to a third temperature; and
    depressurizing the ceramic laminate from the second pressure to a third pressure,
    wherein the second temperature is in a range from 70° C. to 150° C.

2. The method of claim 1, wherein the heating of the ceramic laminate is performed after the pressurizing of the ceramic laminate.

3. The method of claim 2, wherein the cooling of the ceramic laminate is performed before the depressurizing of the ceramic laminate.

4. The method of claim 1, wherein the first pressure is in a range from 0 kgf/cm² to 10 kgf/cm²,
the second pressure is in a range from 500 kgf/cm² to 1500 kgf/cm², and
the third pressure is in a range from 0 kgf/cm² to 10 kgf/cm².

5. The method of claim 1, wherein the first temperature is in a range from 25° C. to 55° C., and
the third temperature is in a range from 25° C. to 55° C.

6. The method of claim 1, wherein in the heating of the ceramic laminate, temperature is increased at a heating rate in a range from 1° C./min to 20° C./min and
in the cooling of the ceramic laminate, temperature is reduced at a cooling rate in a range from 1° C./min to 20° C./min.

7. The method of claim 1, wherein in the maintaining of the compression, a pressure and temperature are maintained for a period of time in a range from 10 sec to 1800 sec.

8. The method of claim 1, wherein the pressurizing the ceramic laminate includes:
pressurizing the ceramic laminate from the first pressure to a first intermediate pressure; and
pressurizing the ceramic laminate from the first intermediate pressure to the second pressure, and
the depressurizing the ceramic laminate includes:
depressurizing the ceramic laminate from the second pressure to a second intermediate pressure; and
depressurizing the ceramic laminate from the second intermediate pressure to the third pressure.

9. The method of claim 8, wherein the heating of the ceramic laminate is performed during the pressurizing of the ceramic laminate, and
the cooling of the ceramic laminate is performed during the depressurizing of the ceramic laminate.

10. The method of claim 8, wherein the first intermediate pressure is in a range from 30 kgf/cm² to 500 kgf/cm², and
the second intermediate pressure is in a range from 30 kgf/cm² to 500 kgf/cm².

11. A method of compressing a ceramic laminate, comprising:
obtaining the ceramic laminate, the ceramic laminate comprising a plurality of dielectric sheets and a conductor pattern disposed thereon;
applying compression pressure to the ceramic laminate to increase pressure on the ceramic laminate from a first pressure to a second pressure;
heating the ceramic laminate from a first temperature to a second temperature while the ceramic laminate is compressed, the second temperature being in a range from 70° C. to 150° C.;
maintaining the ceramic laminate at the second temperature and under compression at the second pressure for a predetermined period of time;
cooling the ceramic laminate from the second temperature to the first temperature while the ceramic laminate is compressed; and
depressurizing the ceramic laminate to reduce pressure on the ceramic laminate from the second pressure to the first pressure.

12. The method of claim 11, wherein applying compression pressure comprises:
increasing pressure on the ceramic laminate from a first pressure to a first intermediate pressure;
maintaining pressure on the ceramic laminate at the first intermediate pressure for a first predetermined period of time; and
increasing pressure on the ceramic laminate from the first intermediate pressure to a second pressure.

13. The method of claim 12, wherein heating the ceramic laminate comprises increasing temperature of the ceramic laminate from the first temperature to the second temperature while the ceramic laminate is under pressure at the first intermediate pressure.

14. The method of claim 11, wherein depressurizing the ceramic laminate comprises:
decreasing pressure on the ceramic laminate from the second pressure to a second intermediate pressure;
maintaining pressure on the ceramic laminate at the second intermediate pressure for a second predetermined period of time; and
decreasing pressure on the ceramic laminate from the second intermediate pressure to a third pressure.

15. The method of claim 14, wherein cooling the ceramic laminate comprises decreasing temperature of the ceramic laminate from the second temperature to a third temperature while the ceramic laminate is under pressure at the second intermediate pressure.

16. The method of claim 1, wherein the conductor pattern comprises a metallic layer, and each of the plurality of dielectric sheets has the conductor pattern disposed thereon, and wherein the ceramic laminate further comprises at least one dielectric sheet without the conductor pattern disposed thereon.

17. The method of claim 11, wherein the conductor pattern comprises a metallic layer, and each of the plurality of dielectric sheets has the conductor pattern disposed thereon, and wherein the ceramic laminate further comprises at least one dielectric sheet without the conductor pattern disposed thereon.

* * * * *